(12) United States Patent
Hsiao et al.

(10) Patent No.: US 8,730,617 B1
(45) Date of Patent: May 20, 2014

(54) TAPERED LEADING AND SIDE SHIELDS FOR USE IN A PERPENDICULAR MAGNETIC RECORDING HEAD

(71) Applicant: HGST Netherlands B.V., Amsterdam (NL)

(72) Inventors: Wen-Chien D. Hsiao, San Jose, CA (US); Shiwen Huang, Fremont, CA (US); Edward H. P. Lee, San Jose, CA (US); Valeri Synogatch, San Jose, CA (US); Sue S. Zhang, Saratoga, CA (US); Yi Zheng, San Ramon, CA (US); Yuming Zhou, Lakeville, MN (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 13/771,300

(22) Filed: Feb. 20, 2013

(51) Int. Cl.
    *G11B 5/127* (2006.01)
(52) U.S. Cl.
    USPC .................................................. 360/125.3
(58) Field of Classification Search
    USPC ................................. 360/319, 125.3, 123.12
    See application file for complete search history.

(56) References Cited

U.S. PATENT DOCUMENTS

| | | | |
|---|---|---|---|
| 7,715,152 B2 * | 5/2010 | Okada et al. ................. | 360/319 |
| 7,894,159 B2 | 2/2011 | Lengsfiled, III et al. | |
| 7,898,766 B2 | 3/2011 | Guan et al. | |
| 7,920,358 B2 | 4/2011 | Jiang et al. | |
| 8,028,400 B2 | 10/2011 | Bonhote et al. | |
| 8,169,741 B2 * | 5/2012 | Taguchi et al. ............ | 360/125.3 |
| 8,315,015 B2 * | 11/2012 | Taguchi et al. ............ | 360/125.3 |
| 2010/0149688 A1 | 6/2010 | Le et al. | |
| 2010/0157472 A1 | 6/2010 | Hsiao et al. | |
| 2010/0232062 A1 * | 9/2010 | Gao et al. ................. | 360/123.12 |
| 2010/0277832 A1 | 11/2010 | Bai et al. | |
| 2010/0302680 A1 | 12/2010 | Hirata et al. | |
| 2012/0026629 A1 | 2/2012 | Hirata et al. | |
| 2012/0044598 A1 | 2/2012 | Bai et al. | |

FOREIGN PATENT DOCUMENTS

WO     WO 2012036680 A1 *  3/2012

* cited by examiner

*Primary Examiner* — Will J Klimowicz
(74) *Attorney, Agent, or Firm* — Zilka-Kotab, PC

(57) ABSTRACT

In one embodiment, a magnetic head includes a main pole having a trapezoidal cross-section at a media-facing surface thereof and a flared shape with a greater width in a cross-track direction at positions away from the media-facing surface, a leading shield positioned near a leading side of the main pole, wherein a leading gap is provided between the main pole and the leading shield, side shields positioned on both sides of the main pole in the cross-track direction adjacent the media-facing surface of the main pole, with side gaps provided between the main pole and both of the side shields, and a trailing gap provided on a trailing side of the main pole at the media-facing surface thereof, with a throat height of the side shields being less than the throat height of the side shields at a position closer to the trailing gap than the leading gap.

19 Claims, 15 Drawing Sheets

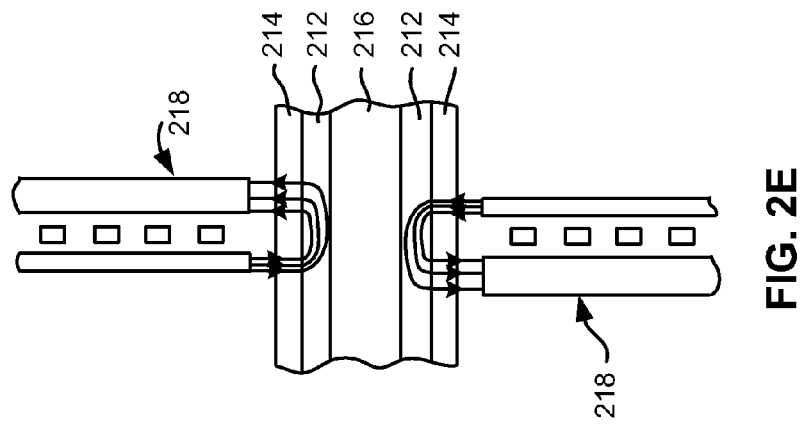
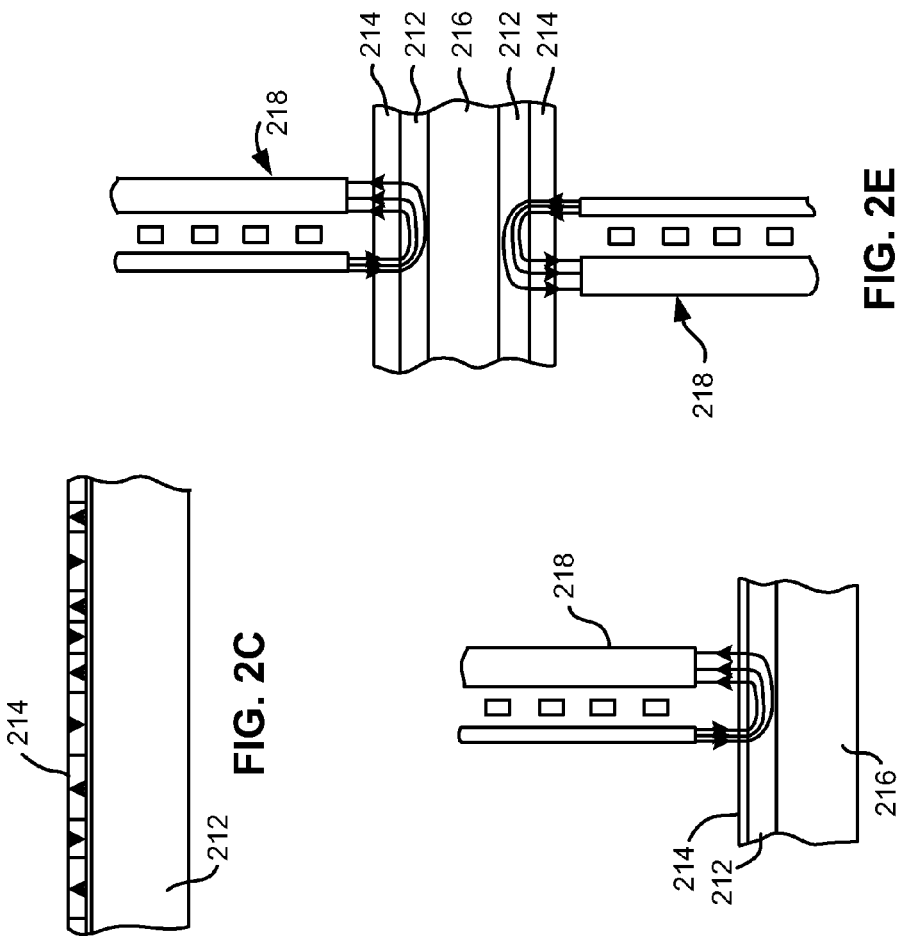
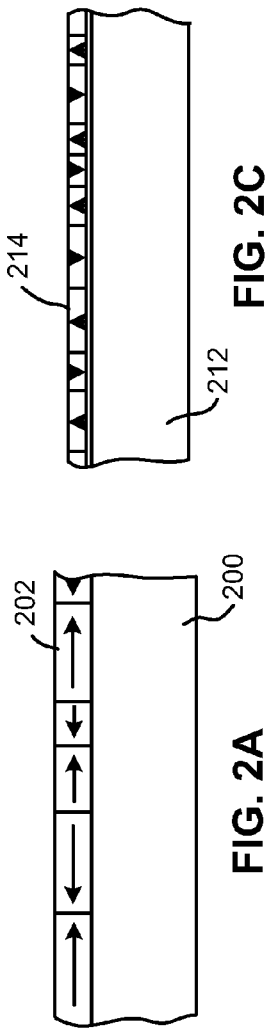
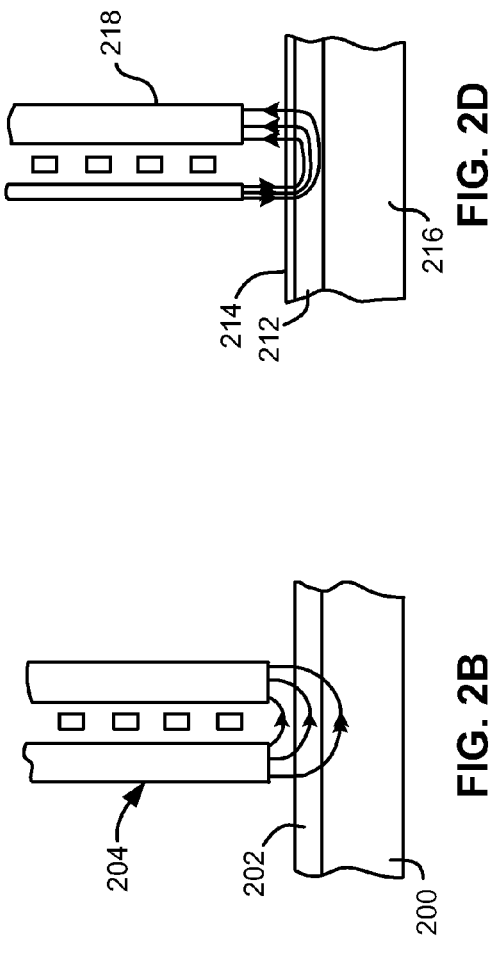

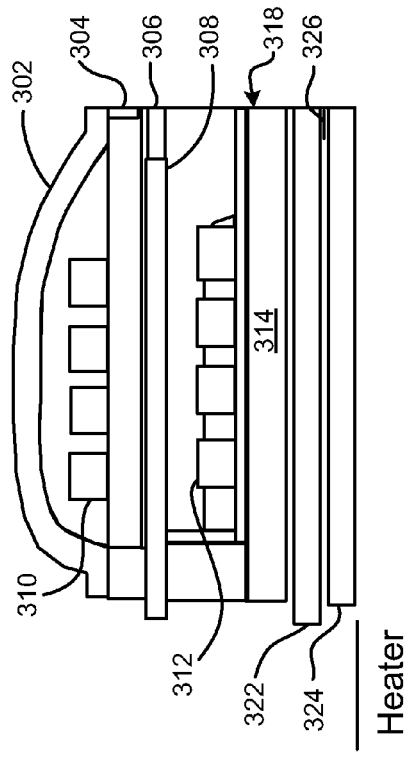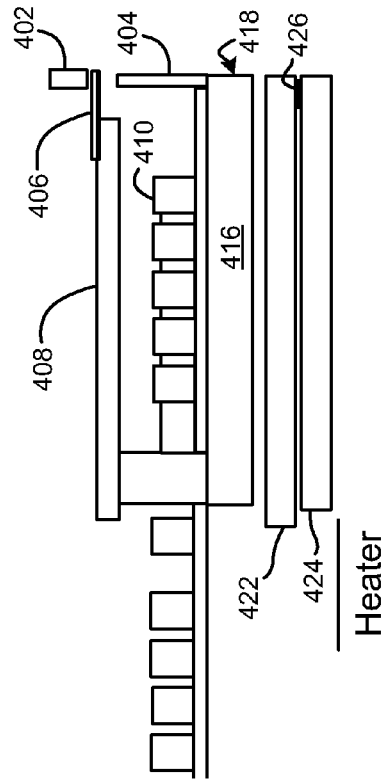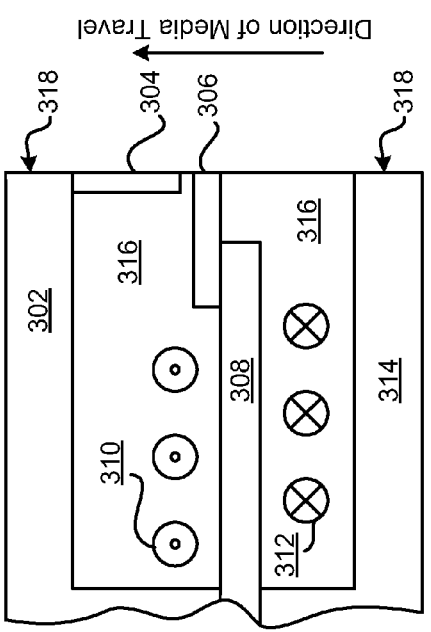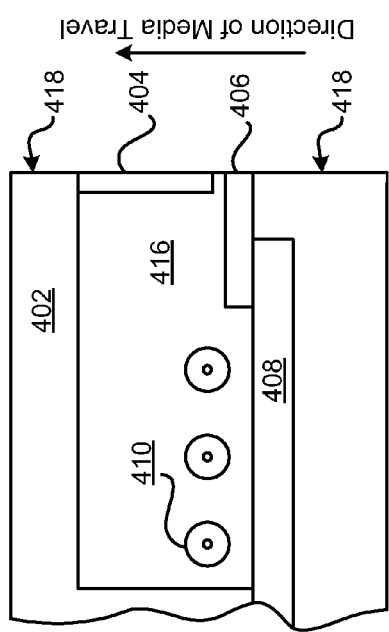

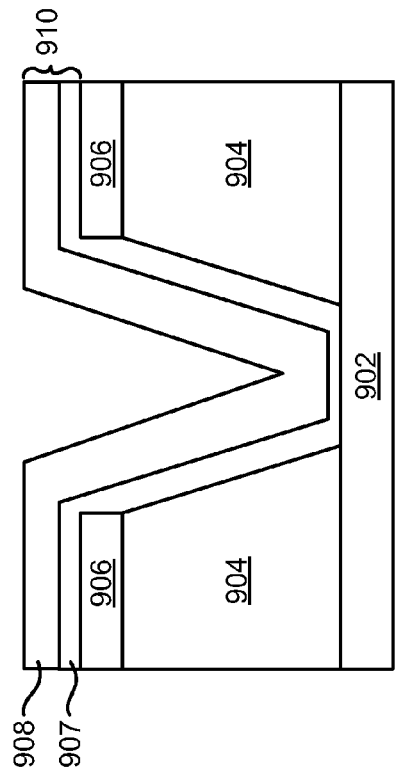
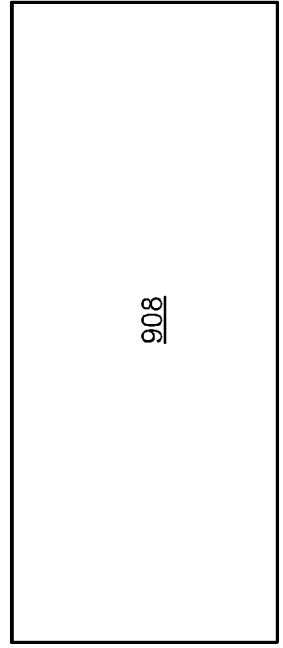
FIG. 9B
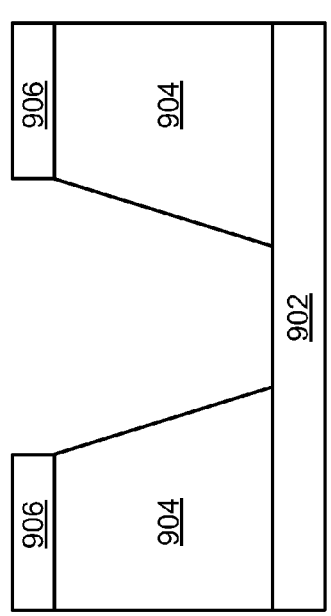
FIG. 9A

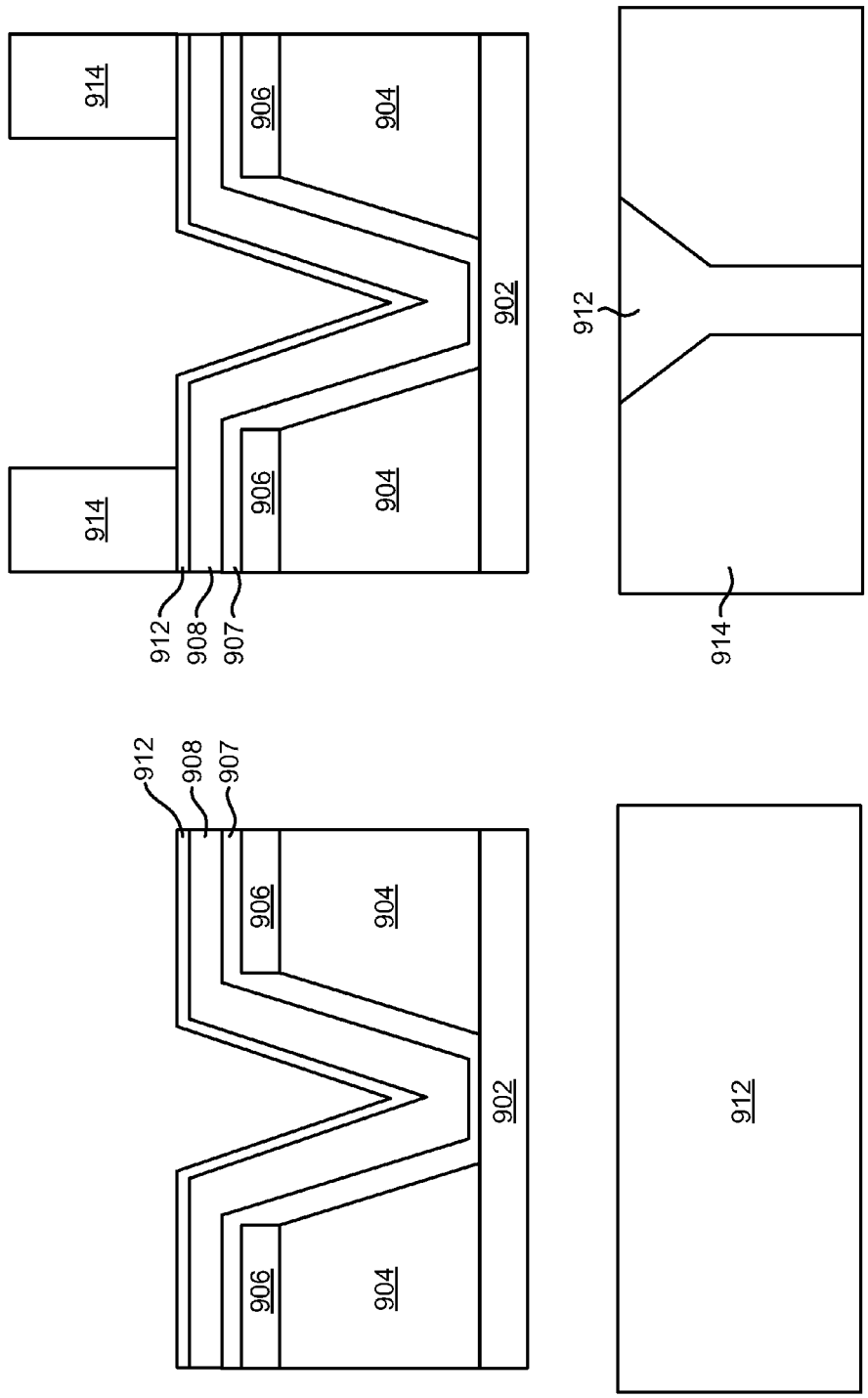

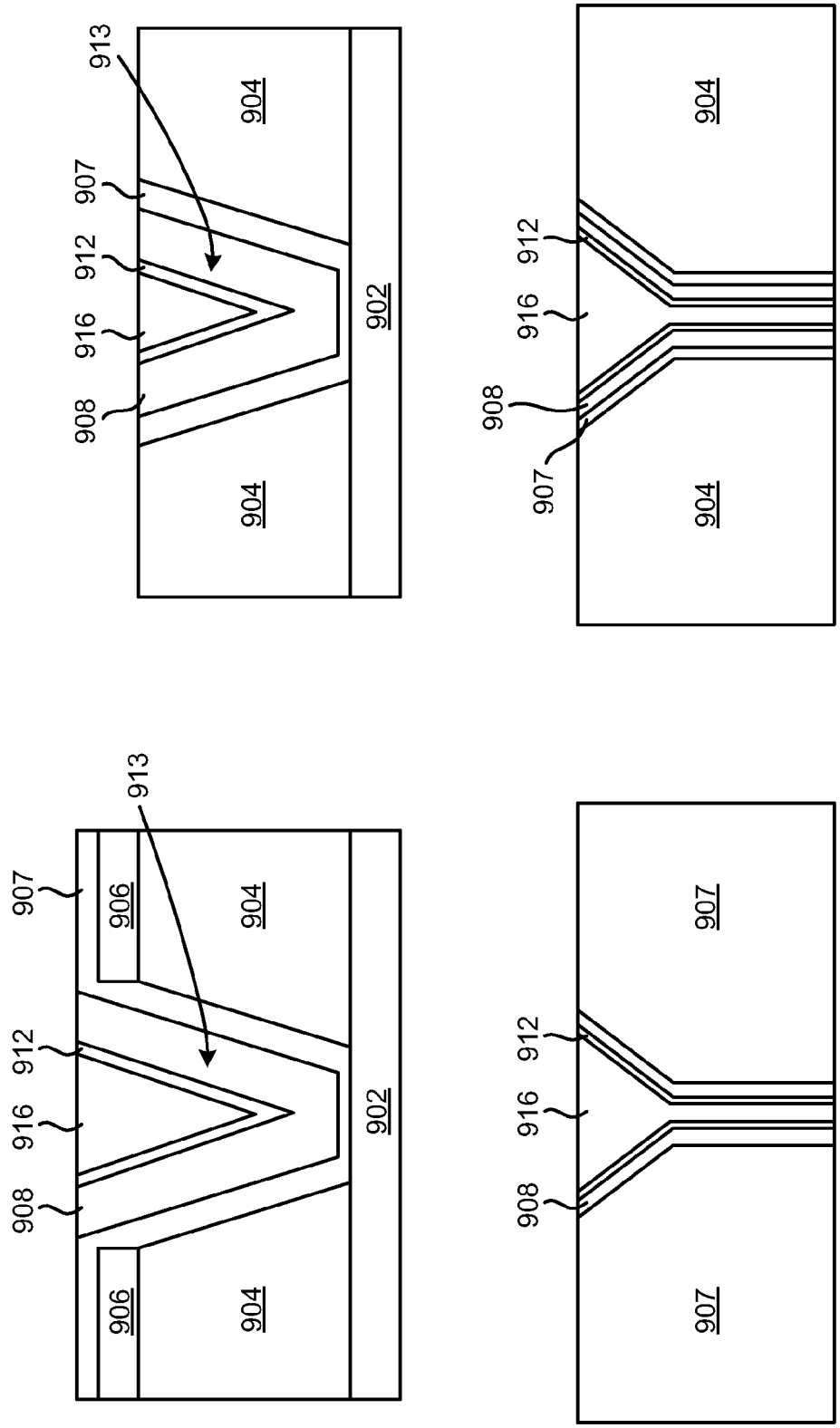

US 8,730,617 B1

TAPERED LEADING AND SIDE SHIELDS FOR USE IN A PERPENDICULAR MAGNETIC RECORDING HEAD

FIELD OF THE INVENTION

The present invention relates to data storage systems, and more particularly, this invention relates to a tapered leading and side shield topology which minimizes flux shunting while benefiting adjacent track interference control.

BACKGROUND

The heart of a computer is a magnetic hard disk drive (HDD) which typically includes a rotating magnetic disk, a slider that has read and write heads, a suspension arm above the rotating disk and an actuator arm that swings the suspension arm to place the read and/or write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

The volume of information processing in the information age is increasing rapidly. In particular, HDDs have been desired to store more information in its limited area and volume. A technical approach to this desire is to increase the capacity by increasing the recording density of the HDD. To achieve higher recording density, further miniaturization of recording bits is effective, which in turn typically requires the design of smaller and smaller components.

The further miniaturization of the various components, however, presents its own set of challenges and obstacles. The usage of a leading shield and side shields is not new to perpendicular magnetic write heads. These types of shields are used in order to reduce the amount of fringe magnetic fields which are emitted from a tapered leading edge of the main pole. While the leading shield reduces a main pole fringe field which causes adjacent track interference and far track interference, it also has an undesirable effect of reducing a main pole write field, which is already too weak in current perpendicular magnetic write heads for some writing applications. Therefore, it would be beneficial to have a more efficient process for producing a leading and side shield, and a leading and side shield topology which serves as an effective adjacent track interference fringe field shield while at the same time not significantly reducing the main pole's write field.

SUMMARY

In one embodiment, a magnetic head includes a main pole having a trapezoidal cross-section at a media-facing surface thereof, the main pole having a flared shape with a greater width in a cross-track direction at positions away from the media-facing surface than at the media-facing surface, a leading shield positioned near a leading side of the main pole, wherein a leading gap is provided between the main pole and the leading shield, side shields positioned on both sides of the main pole in the cross-track direction adjacent the media-facing surface of the main pole, with side gaps provided between the main pole and both of the side shields, and a trailing gap provided on a trailing side of the main pole at the media-facing surface thereof, with a throat height of the side shields at a position closer to the trailing gap being less than the throat height of the side shields at a position closer to the leading gap.

In another embodiment, a method for forming a magnetic head includes forming a shaping layer above a leading shield, forming a trench in the shaping layer which has tapered side walls, forming a leading gap and side gaps within the trench, forming a main pole above the leading gap and side gaps using the trench, the main pole having a trapezoidal cross-section at a media-facing surface thereof, forming a trailing gap above the main pole, forming side shields disposed adjacent the side gaps on both sides of the main pole in a cross-track direction, and forming a trailing shield disposed above the trailing gap, with the side shields being formed such that a throat height at a position closer to the trailing gap is less than a throat height at a position closer to the leading gap.

Any of these embodiments may be implemented in a magnetic data storage system such as a disk drive system, which may include a magnetic head, a drive mechanism for passing a magnetic medium (e.g., hard disk) over the magnetic head, and a controller electrically coupled to the magnetic head.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

FIG. 2A is a schematic representation in section of a recording medium utilizing a longitudinal recording format.

FIG. 2B is a schematic representation of a conventional magnetic recording head and recording medium combination for longitudinal recording as in FIG. 2A.

FIG. 2C is a magnetic recording medium utilizing a perpendicular recording format.

FIG. 2D is a schematic representation of a recording head and recording medium combination for perpendicular recording on one side.

FIG. 2E is a schematic representation of a recording apparatus adapted for recording separately on both sides of the medium.

FIG. 3A is a cross-sectional view of one particular embodiment of a perpendicular magnetic head with helical coils.

FIG. 3B is a cross-sectional view of one particular embodiment of a piggyback magnetic head with helical coils.

FIG. 4A is a cross-sectional view of one particular embodiment of a perpendicular magnetic head with looped coils.

FIG. 4B is a cross-sectional view of one particular embodiment of a piggyback magnetic head with looped coils.

FIGS. 9A-9L show a cross-sectional view and a top view of a magnetic head formation process according to one embodiment.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc. It must also be noted that, as used in the specification and the appended claims, the singular forms "a," "an" and "the" include plural referents unless otherwise specified.

The following description discloses several preferred embodiments of disk-based storage systems and/or related systems and methods, as well as operation and/or component parts thereof.

In one general embodiment, a magnetic head includes a main pole having a trapezoidal cross-section at a media-facing surface thereof, the main pole having a flared shape with a greater width in a cross-track direction at positions away from the media-facing surface than at the media-facing surface, a leading shield positioned near a leading side of the main pole, wherein a leading gap is provided between the main pole and the leading shield, side shields positioned on both sides of the main pole in the cross-track direction adjacent the media-facing surface of the main pole, with side gaps provided between the main pole and both of the side shields, and a trailing gap provided on a trailing side of the main pole at the media-facing surface thereof, with a throat height of the side shields at a position closer to the trailing gap being less than the throat height of the side shields at a position closer to the leading gap.

In another general embodiment, a method for forming a magnetic head includes forming a shaping layer above a leading shield, forming a trench in the shaping layer which has tapered side walls, forming a leading gap and side gaps within the trench, forming a main pole above the leading gap and side gaps using the trench, the main pole having a trapezoidal cross-section at a media-facing surface thereof, forming a trailing gap above the main pole, forming side shields disposed adjacent the side gaps on both sides of the main pole in a cross-track direction, and forming a trailing shield disposed above the trailing gap, with the side shields being formed such that a throat height at a position closer to the trailing gap is less than a throat height at a position closer to the leading gap.

Figure 1:
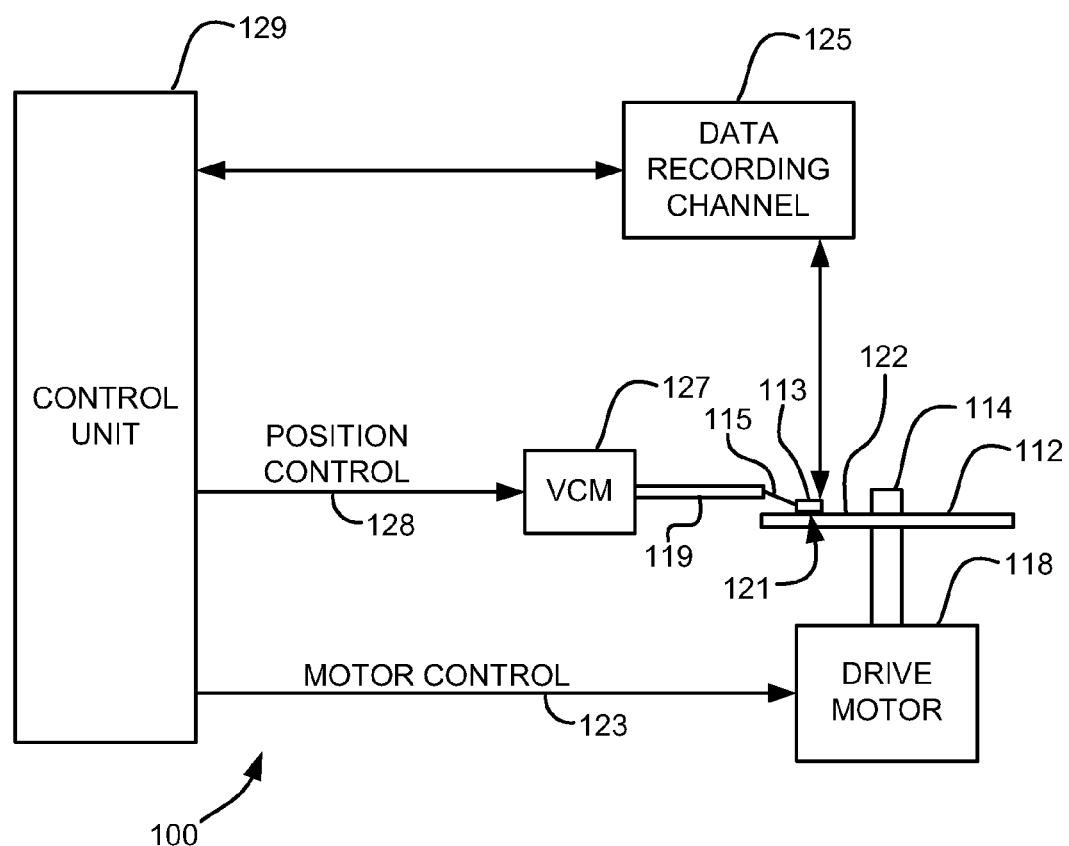
FIG. 1 is a simplified drawing of a magnetic recording disk drive system.

Referring now to FIG. 1, there is shown a disk drive 100 in accordance with one embodiment of the present invention. As shown in FIG. 1, at least one rotatable magnetic disk 112 is supported on a spindle 114 and rotated by a drive mechanism, which may include a disk drive motor 118. The magnetic recording on each disk is typically in the form of an annular pattern of concentric data tracks (not shown) on the disk 112.

At least one slider 113 is positioned near the disk 112, each slider 113 supporting one or more magnetic read/write heads 121. As the disk rotates, slider 113 is moved radially in and out over disk surface 122 so that heads 121 may access different tracks of the disk where desired data are recorded and/or to be written. Each slider 113 is attached to an actuator arm 119 by means of a suspension 115. The suspension 115 provides a slight spring force which biases slider 113 against the disk surface 122. Each actuator arm 119 is attached to an actuator 127. The actuator 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of disk 112 generates an air bearing between slider 113 and disk surface 122 which exerts an upward force or lift on the slider. The air bearing thus counter-balances the slight spring force of suspension 115 and supports slider 113 off and slightly above the disk surface by a small, substantially constant spacing during normal operation. Note that in some embodiments, the slider 113 may slide along the disk surface 122.

The various components of the disk storage system are controlled in operation by control signals generated by controller 129, such as access control signals and internal clock signals. Typically, controller 129 comprises logic control circuits, storage (e.g., memory), and a microprocessor. The controller 129 generates control signals to control various system operations such as drive motor control signals on line 123 and head position and seek control signals on line 128. The control signals on line 128 provide the desired current profiles to optimally move and position slider 113 to the desired data track on disk 112. Read and write signals are communicated to and from read/write heads 121 by way of recording channel 125.

The above description of a typical magnetic disk storage system, and the accompanying illustration of FIG. 1 is for representation purposes only. It should be apparent that disk storage systems may contain a large number of disks and actuators, and each actuator may support a number of sliders.

An interface may also be provided for communication between the disk drive and a host (integral or external) to send and receive the data and for controlling the operation of the disk drive and communicating the status of the disk drive to the host, all as will be understood by those of skill in the art.

In a typical head, an inductive write head includes a coil layer embedded in one or more insulation layers (insulation stack), the insulation stack being located between first and second pole piece layers. A gap is formed between the first and second pole piece layers by a gap layer at an air bearing surface (ABS) of the write head. The pole piece layers may be connected at a back gap. Currents are conducted through the coil layer, which produce magnetic fields in the pole pieces. The magnetic fields fringe across the gap at the ABS for the purpose of writing bits of magnetic field information in tracks on moving media, such as in circular tracks on a rotating magnetic disk.

The second pole piece layer has a pole tip portion which extends from the ABS to a flare point and a yoke portion which extends from the flare point to the back gap. The flare point is where the second pole piece begins to widen (flare) to form the yoke. The placement of the flare point directly affects the magnitude of the magnetic field produced to write information on the recording medium.

FIG. 2A illustrates, schematically, a conventional recording medium such as used with magnetic disc recording systems, such as that shown in FIG. 1. This medium is utilized for recording magnetic impulses in or parallel to the plane of the medium itself. The recording medium, a recording disc in this instance, comprises basically a supporting substrate 200 of a suitable non-magnetic material such as glass, with an overlying coating 202 of a suitable and conventional magnetic layer.

FIG. 2B shows the operative relationship between a conventional recording/playback head 204, which may preferably be a thin film head, and a conventional recording medium, such as that of FIG. 2A.

FIG. 2C illustrates, schematically, the orientation of magnetic impulses substantially perpendicular to the surface of a recording medium as used with magnetic disc recording systems, such as that shown in FIG. 1. For such perpendicular recording the medium typically includes an under layer 212 of a material having a high magnetic permeability. This under layer 212 is then provided with an overlying coating 214 of magnetic material preferably having a high coercivity relative to the under layer 212.

FIG. 2D illustrates the operative relationship between a perpendicular head 218 and a recording medium. The recording medium illustrated in FIG. 2D includes both the high permeability under layer 212 and the overlying coating 214 of magnetic material described with respect to FIG. 2C above. However, both of these layers 212 and 214 are shown applied to a suitable substrate 216. Typically there is also an additional layer (not shown) called an "exchange-break" layer or "interlayer" between layers 212 and 214.

In this structure, the magnetic lines of flux extending between the poles of the perpendicular head 218 loop into and out of the overlying coating 214 of the recording medium with the high permeability under layer 212 of the recording medium causing the lines of flux to pass through the overlying coating 214 in a direction generally perpendicular to the surface of the medium to record information in the overlying coating 214 of magnetic material preferably having a high coercivity relative to the under layer 212 in the form of magnetic impulses having their axes of magnetization substantially perpendicular to the surface of the medium. The flux is channeled by the soft under layer 212 back to the return layer (P1) of the head 218.

FIG. 2E illustrates a similar structure in which the substrate 216 carries the layers 212 and 214 on each of its two opposed sides, with suitable recording heads 218 positioned adjacent the outer surface of the magnetic overlying coating 214 on each side of the medium, allowing for recording on each side of the medium.

FIG. 3A is a cross-sectional view of a perpendicular magnetic head. In FIG. 3A, helical coils 310 and 312 are used to create magnetic flux in the stitch pole 308, which then delivers that flux to the main pole 306. Coils 310 indicate coils extending out from the page, while coils 312 indicate coils extending into the page. Stitch pole 308 may be recessed from the ABS 318. Insulation 316 surrounds the coils and may provide support for some of the elements. The direction of the media travel, as indicated by the arrow to the right of the structure, moves the media past the lower return pole 314 first, then past the stitch pole 308, main pole 306, trailing shield 304 which may be connected to the wrap around shield (not shown), and finally past the upper return pole 302. Each of these components may have a portion in contact with the ABS 318. The ABS 318 is indicated across the right side of the structure.

Perpendicular writing is achieved by forcing flux through the stitch pole 308 into the main pole 306 and then to the surface of the disk positioned towards the ABS 318.

FIG. 3B illustrates a piggyback magnetic head having similar features to the head of FIG. 3A. Two shields 304, 314 flank the stitch pole 308 and main pole 306. Also sensor shields 322, 324 are shown. The sensor 326 is typically positioned between the sensor shields 322, 324.

FIG. 4A is a schematic diagram of one embodiment which uses looped coils 410, sometimes referred to as a pancake configuration, to provide flux to the stitch pole 408. The stitch pole then provides this flux to the main pole 406. In this orientation, the lower return pole is optional. Insulation 416 surrounds the coils 410, and may provide support for the stitch pole 408 and main pole 406. The stitch pole may be recessed from the ABS 418. The direction of the media travel, as indicated by the arrow to the right of the structure, moves the media past the stitch pole 408, main pole 406, trailing shield 404 which may be connected to the wrap around shield (not shown), and finally past the upper return pole 402 (all of which may or may not have a portion in contact with the ABS 418). The ABS 418 is indicated across the right side of the structure. The trailing shield 404 may be in contact with the main pole 406 in some embodiments.

FIG. 4B illustrates another type of piggyback magnetic head having similar features to the head of FIG. 4A including a looped coil 410, which wraps around to form a pancake coil. Also, sensor shields 422, 424 are shown. The sensor 426 is typically positioned between the sensor shields 422, 424.

In FIGS. 3B and 4B, an optional heater is shown near the non-ABS side of the magnetic head. A heater (Heater) may also be included in the magnetic heads shown in FIGS. 3A and 4A. The position of this heater may vary based on design parameters such as where the protrusion is desired, coefficients of thermal expansion of the surrounding layers, etc.

Figure 5A:
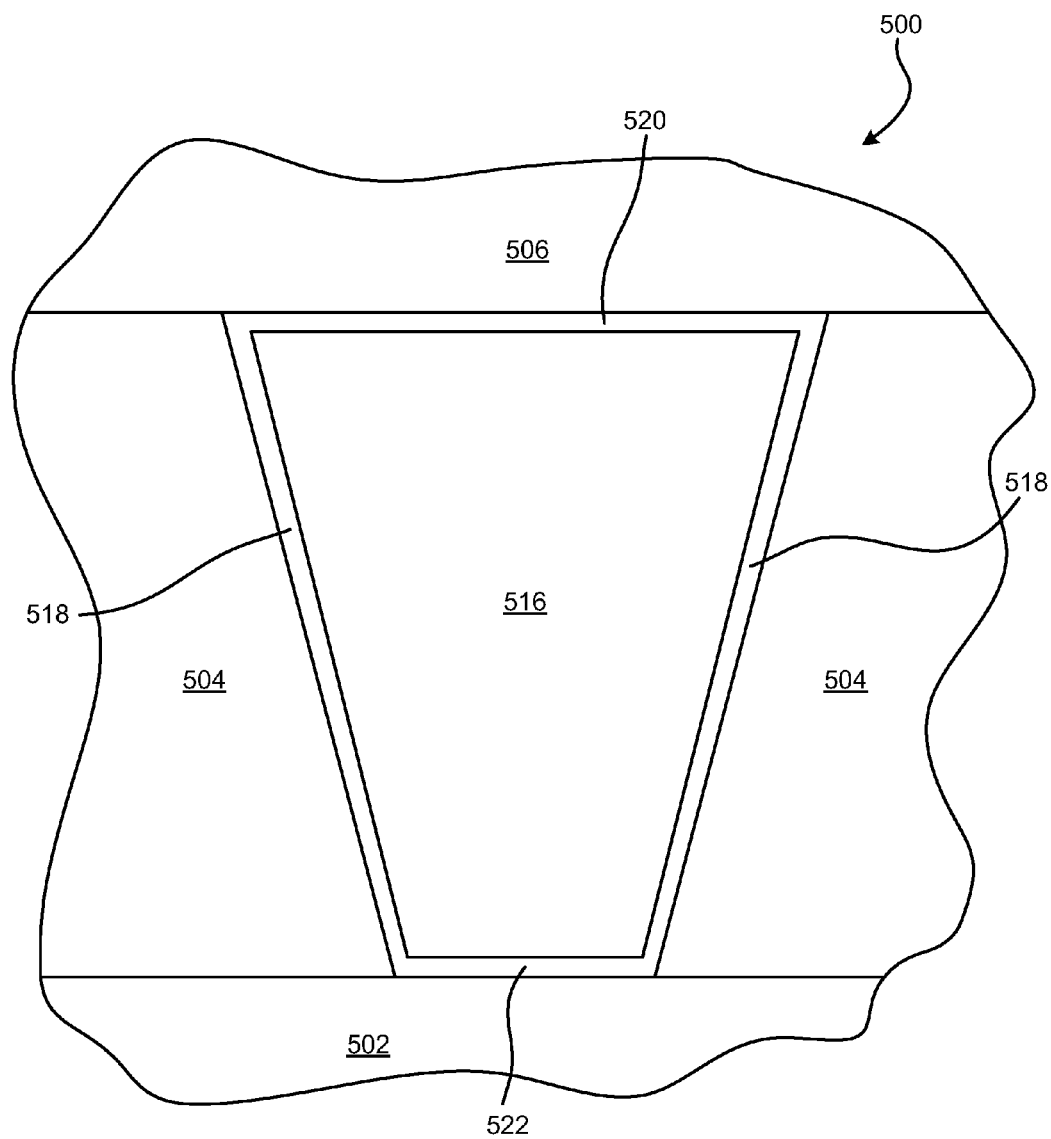
FIG. 5A is an air bearing surface view of a magnetic head, according to one embodiment.

With reference to FIG. 5A, a portion of a magnetic structure 500 is shown from the ABS. As can be seen, a main pole 516 is surrounded by gaps on all sides. The leading gap 522 is positioned between the main pole 516 and the leading shield 502, the trailing gap 520 is positioned between the main pole 516 and the trailing shield 506, and side gaps 518 are positioned on either side of the main pole 516 in a cross-track direction between the main pole 516 and side shields 504. The gaps 518, 520, 522, in some embodiments, are formed very thin, such as via atomic layer deposition, to provide just enough of a layer such that sides of the shields 502, 504, 506 are not in electrical communication with sides of the main pole 516.

According to one embodiment, magnetic performance of a magnetic structure, such as the magnetic head 500 shown in FIG. 5A, may be enhanced through formation techniques described herein. For example, fabrication approaches may produce a magnetic head 500 with improved performance characteristics by having a tapered side shield 504 formed from a metal trench Damascene process, which provides for protrusion reduction from having less Ru side gap or no Ru side gap at all in the metal trench Damascene process. According to one embodiment, an alumina ($Al_2O_3$) trench may be used in the metal trench Damascene process. In addition, a reduced bevel angle with respect to the ABS into the flare may also be achieved due to a larger mask opening in the flare region.

Figure 5B:
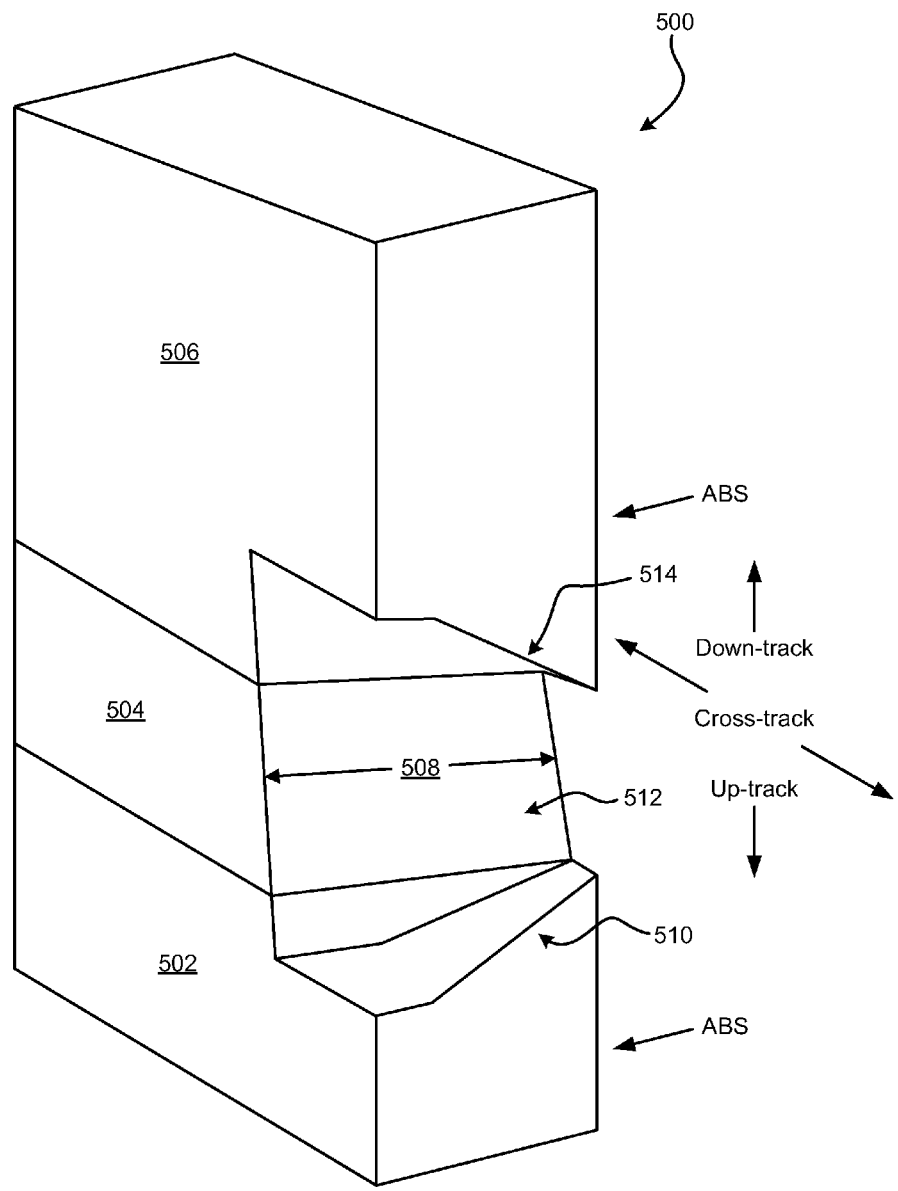
FIG. 5B is a simplified isometric view of a magnetic head.

Referring now to FIG. 5B, a cross-sectional isometric view of a magnetic structure 500 is shown. A common practice in the prior art utilizes a non-magnetic leading gap between a leading edge taper 510 of the main pole (the main pole and gaps surrounding the main pole have been removed from FIG. 5B so that the structures surrounding the main pole are evident) and a leading shield 502, as well as a non-magnetic side gap between a side taper 512 of the main pole and a side shield 504, in such a way that the leading shield 502 conforms with the leading edge taper 510 of the main pole, and the side shield 504 conforms with the side taper 512 of the main pole, throughout the entire throat height 508 of the leading shield 502 and the side shield 504, as illustrated in FIG. 5B. The magnetic structure 500 may also comprise a trailing shield 506 which conforms to a trailing edge taper 514. Notice that a throat height 508 of both the leading shield 502 and the side shield 504 near the leading gap and the side gap is fixed without variation. Balance between suppressing the undesired fringe field and maintaining an adequate writing field is achieved by adjusting a width of the side gap and the leading gap.

Figure 6:
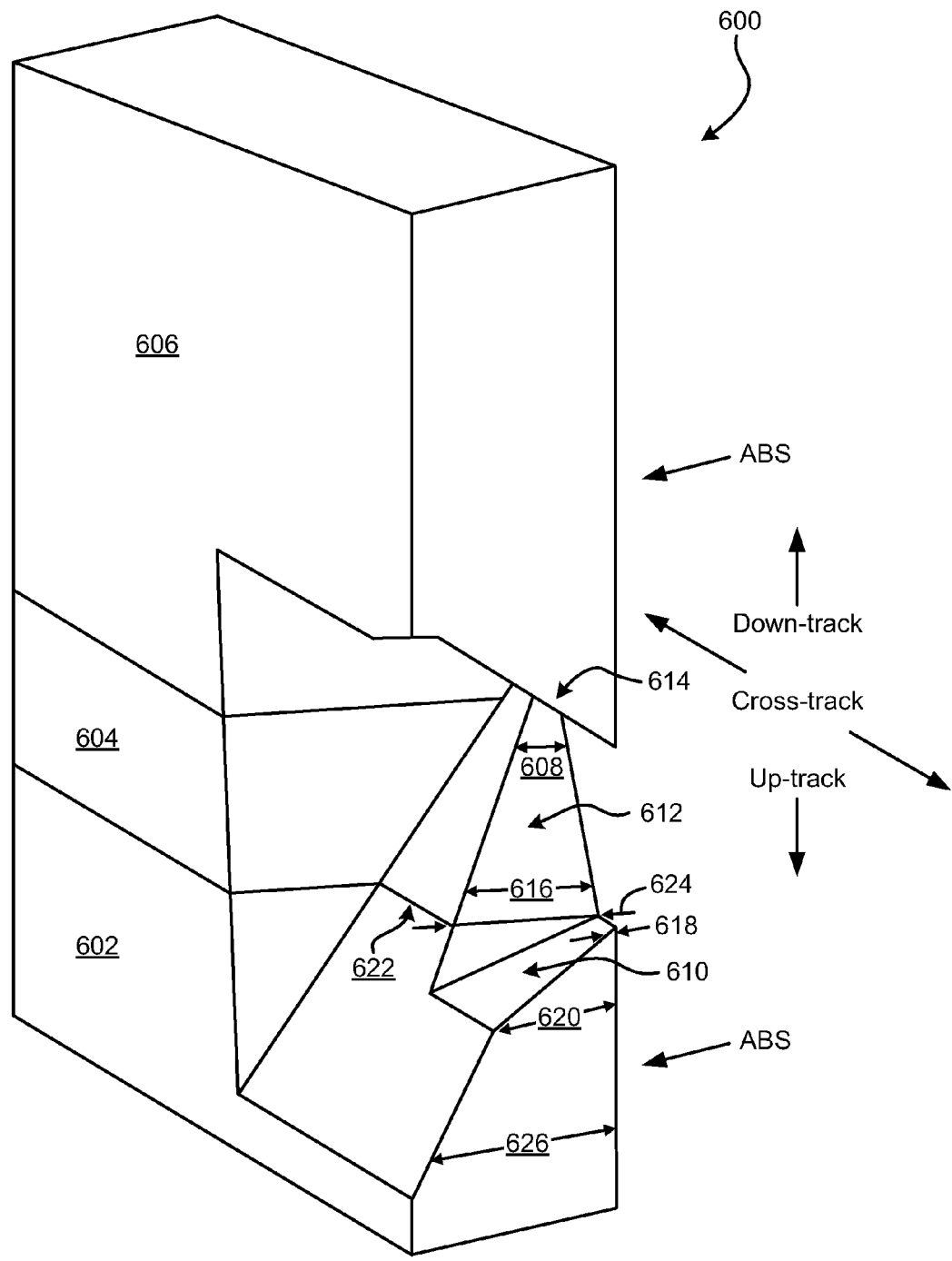
FIG. 6 is a simplified isometric view of a magnetic head, according to one embodiment.

Now referring to FIG. 6, a tapered leading and side shield (LSS) topology of a magnetic structure 600 is shown according to one embodiment. What is meant by tapered is that a throat height 608, 616 of the leading shield 602 and the side shield 604 positioned near the leading gap and the side gap vary, with the side shield 604 having a thinner throat height 608 positioned near the trailing gap and a thicker throat height 616 positioned near the leading gap. This structure is possible because a side taper 612 of the side shields 604 and a leading taper 610 of the leading shield 602 end after a limited distance. At this point, the tapered LSS topology dictates that the throat height of the side shields 604 and the leading shield 602 taper gradually away from the ABS. The magnetic structure 600 may also comprise a trailing shield 606 which conforms to a trailing edge taper 614, in one approach.

In one embodiment, the taper may be linear away from the ABS, as shown in FIG. 6. In an alternate embodiment, the taper may be curved, sloped, integral, or otherwise non-planar, as would be understood by one of skill in the art. Of course, other types of taper may also be used, as long as they are capable of being manufactured in a head manufacturing process.

Such a topology provides certain benefits, including optimal balancing between suppressing the undesired fringe field near the leading gap and the side gap as well as maintaining an adequate write field strength near the trailing gap. Such a topology is also useful for coping with write head design challenges in which restoring lost writability is of great importance.

According to one embodiment, referring again to FIGS. 5A and 6, a magnetic head 600 may comprise a main pole 516 having a trapezoidal cross-section at a media-facing surface thereof (also referred to as the ABS), a leading shield 502, 602 positioned near a leading side of the main pole 516, wherein a leading gap 522 is provided between the main pole 516 and the leading shield 502, 602, side shields 504, 604 positioned on both sides of the main pole 516 in the cross-track direction at the media-facing surface of the main pole 516, wherein side gaps 518 are provided between the main pole 516 and both of the side shields 504, 604, and a trailing gap 520 provided on a trailing side of the main pole 516 at the media-facing surface thereof. The main pole 516 has a flared shape with a greater width in a cross-track direction at positions away from the media-facing surface than at the media-facing surface, e.g., the main pole 516 has a flare shape as known in the art. In addition, a throat height 608 of the side shields 604 at a position closer to the trailing gap 520 is less than the throat height 616 of the side shields 604 at a position closer to the leading gap 522.

In another embodiment, a throat height 618 of the leading shield 502, 602 at the leading gap 522 is less than the throat height 620 of the leading shield 502, 602 at a position up-track from the leading gap 522.

According to another embodiment, at an intersection 622 between the side shields 504, 604 and the leading shield 502, 602, the throat height 624 of the side shields 504, 604 substantially equals a throat height 624 of the leading shield 502, 602. Furthermore, in another approach, the throat height 626 of the leading shield 502, 602, at positions up-track from the intersection 622 between the side shields 504, 604 and the leading shield 502, 602, is greater than the throat height 624 of the leading shield 502, 602 at the intersection 622 between the side shields 504, 604 and the leading shield 502, 602.

In another approach, near the intersection of the leading gap 522 and each of the side gaps 518, the throat height 618 of the leading shield 502, 602 is less than the throat height 624 of each of the side shields 504, 604.

According to one approach, the leading shield 502, 602 and the side shields 504, 604 reduce an amount of excess fringe field emanated from a tapered leading edge of the main pole 516 during operation of the magnetic head 600.

Figure 7A:
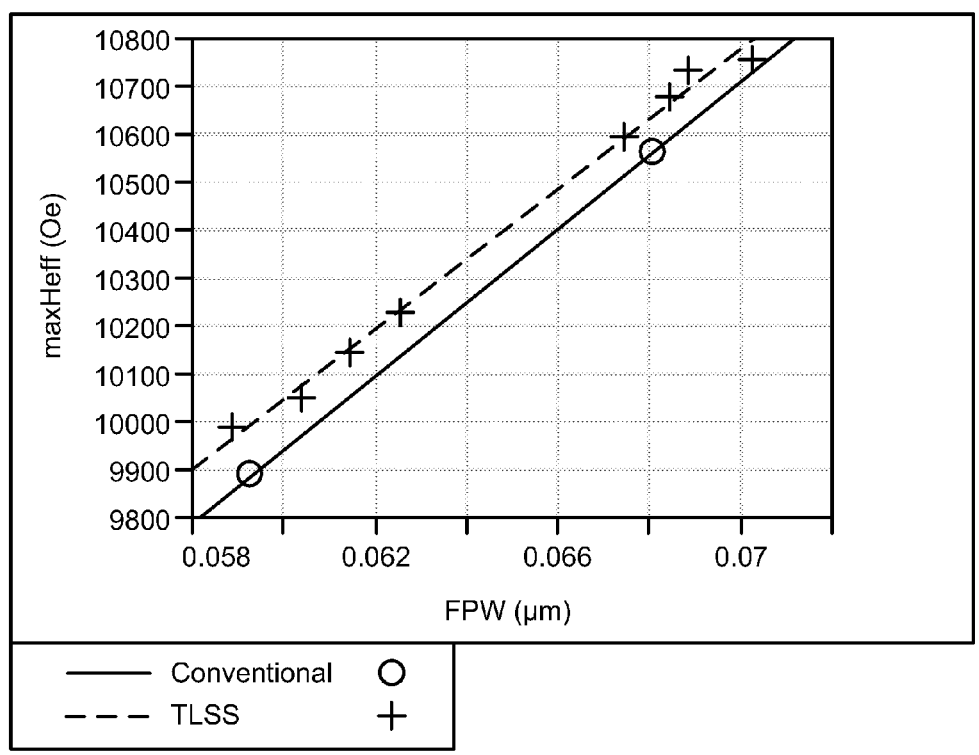
FIG. 7A is a chart showing magnetic head performance, comparing the prior art to one embodiment.
Figure 7B:
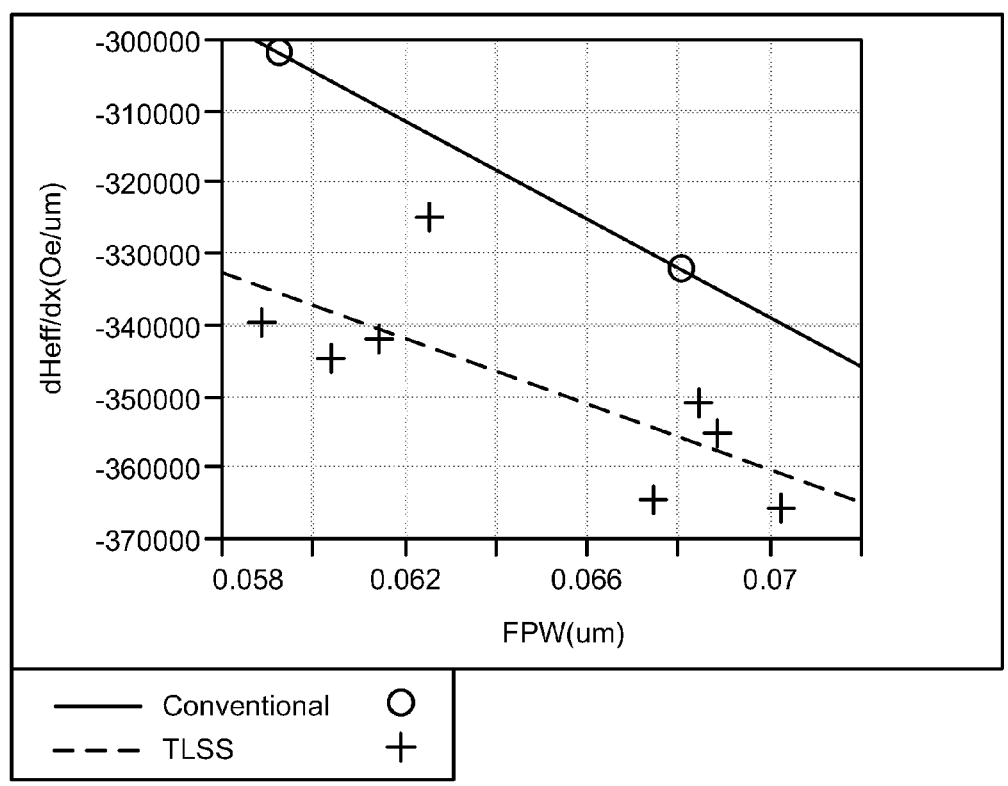
FIG. 7B is a chart showing magnetic head performance, comparing the prior art to one embodiment.

Initial modeling results shown in FIGS. 7A-7B affirm that the tapered LSS is capable of optimizing flux shunting, which thereby improves write field strength and gradient as compared to a conventional non-tapered LSS. FIG. 7A shows the bivariate fit of the maximum effective magnetic field (maxHeff) measured in Oe versus foot-print width (FPW) measured in μm. The FPW is the width of a contour defined by a condition where the write head field equals a predefined field value (and is usually related to the coercivity of the media). FPW may be correlated to the magnetic core width (MCW), which is a more typically used parameter. FIG. 7B shows the bivariate fit of the change in effective magnetic field (dHeff) measured in Oe/μm versus FPW.

The shape or topology of the tapered LSS may be constructed from either a flat surface (as illustrated in FIG. 6) or a curved surface, depending on processing capability in the manufacture of the tapered LSS, as long as the throat height of the side shields and leading shield becomes greater toward the trailing gap from the leading gap. In one approach, a varying throat height of the leading shield and side shields is employed near the main pole in a direction from the trailing gap to the leading gap. Any perpendicular magnetic head topology that realizes such a design may be used, and the benefits discussed herein may be realized, in various embodiments.

In some approaches, the magnetic head 600 as shown in FIG. 6 may be used in a magnetic data storage system. The magnetic data storage system may be similar to that shown in FIG. 1. For example, the magnetic data storage system, such as disk drive 100 may comprise at least one magnetic head 121 as described according to any embodiment herein, a magnetic medium such as a disk 112, a drive mechanism such as a disk drive motor 118 for passing the disk 112 over the at least one magnetic head 121, and a controller 129 electrically coupled to the at least one magnetic head 121 for controlling operation of the at least one magnetic head 121.

Figure 8:
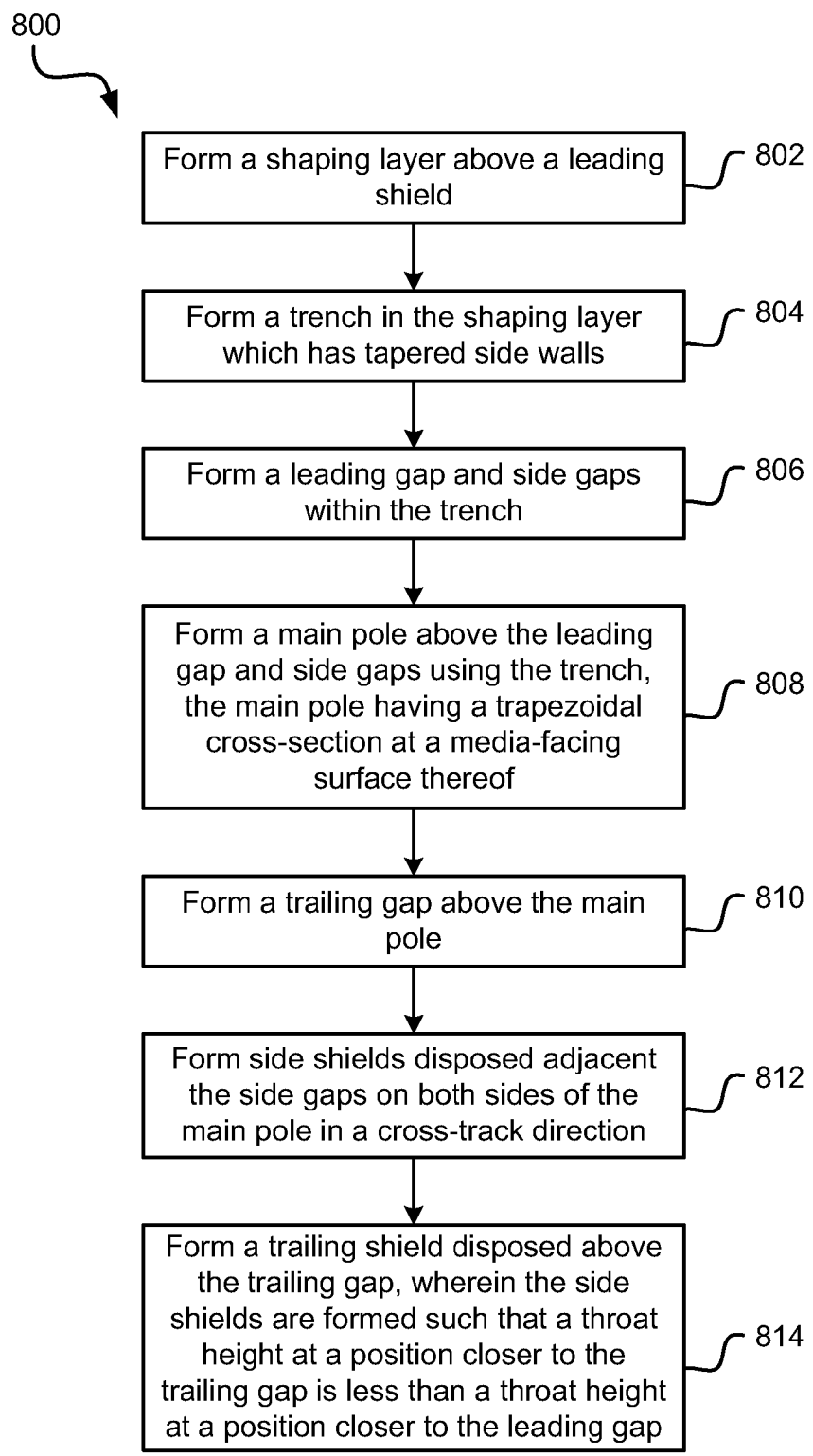
FIG. 8 is a flowchart of a method, according to one embodiment.

FIG. 8 shows a method 800 for forming a magnetic head in accordance with one embodiment. As an option, the present method 800 may be implemented to construct structures such as those shown in FIGS. 1-6. Of course, however, this method 800 and others presented herein may be used to form magnetic structures for a wide variety of devices and/or purposes which may or may not be related to magnetic recording. Further, the methods presented herein may be carried out in any desired environment. It should also be noted that any aforementioned features may be used in any of the embodiments described in accordance with the various methods.

In operation 802, a shaping layer is formed above a leading shield. The leading shield may comprise any suitable material known in the art, such as magnetic material, conductive material, Co, Ni, Fe, combinations thereof, etc. The shaping layer may comprise any material, such as alumina ($Al_2O_3$), MgO, etc., that is capable of being shaped using conventional methods, such as reactive-ion etching (RIE), milling, chemical-mechanical polishing (CMP), etc.

In operation 804, a trench, which has tapered side walls, is formed in the shaping layer. The trench imparts a shape to layers formed thereabove. Some of these layers are the side gaps, leading gap, leading shield, and side shields. The shape of all of these layers are affected by the trench's shape, such that a throat height of the side shields at a position closer to the trailing gap is less than a throat height of the side shields at a position closer to the leading gap.

In operation 806, a leading gap and side gaps are formed within the trench. These gap layers may be formed using any conventional technique, such as plating, atomic layer deposition (ALD), sputtering, etc. Furthermore, the gap layers may comprise any suitable material known in the art, such as Ru, alumina, MgO, etc.

In one approach, in order to improve the performance of a magnetic head produced by method 800, a tapered side shield may be formed from a metal trench Damascene process, which provides for protrusion reduction from having less Ru side gap or no Ru side gap at all in the metal trench Damascene process. Specifically, according to one embodiment, an alumina trench may be used in the metal trench Damascene process. In addition, a reduced bevel angle with respect to the ABS into the flare may also be achieved due to a larger mask opening in the flare region due to the use of the metal trench Damascene process.

In operation 808, a main pole is formed above the leading gap and side gaps using the trench, the main pole having a trapezoidal cross-section at a media-facing surface thereof. The main pole may comprise any suitable material, such as a material having a high magnetic moment, Co, Fe, Ni, some combination thereof, etc. The formation of the main pole may make use of intermediate steps, such as masking areas of the structure where the main pole is not being formed with a resist, plating the main pole material into the exposed portions, and then back-filling with an insulative material, such as alumina, MgO, etc. This structure may then be planarized, such as via CMP, to provide the main pole structure.

In one approach, the main pole may have a flared shape with a greater width in a cross-track direction at positions away from the media-facing surface than at the media-facing surface.

In operation 810, a trailing gap is formed above the main pole, using any technique known in the art, such as using a seed layer, and then depositing material for the trailing gap above the seed layer. The trailing gap may comprise any suitable material known in the art, such as C, Cr, alumina, MgO, some combination thereof, etc.

In operation 812, side shields disposed adjacent the side gaps on both sides of the main pole in a cross-track direction are formed. These side shields may be formed using any conventional technique, such as plating, ALD, sputtering, seeding and then plating above the seed layer, etc. Furthermore, the side shields may comprise any suitable material known in the art, such as Co, Fe, Ni, some combination thereof, etc.

In operation 814, a trailing shield disposed above the trailing gap is formed. This trailing shield may be formed using any conventional technique, such as plating, ALD, sputtering, seeding and then plating above the seed layer, etc. Furthermore, the trailing shield may comprise any suitable material known in the art, such as Co, Fe, Ni, some combination thereof, etc.

According to one embodiment, the side shields and the trailing shield may be formed in a single formation process. The single formation process may comprise forming a resist layer in a negative pattern to the trailing shield and the side shields, removing the shaping layer from surfaces of the side gaps which are not in contact with the main pole at a position near the media-facing surface thereof, and depositing a magnetic material adjacent the side gaps and the trailing gap using the resist pattern to form the trailing shield and the side shields.

In one embodiment, the leading shield may be formed such that a throat height at the leading gap is less than a throat height at a position of the leading shield up-track from the leading gap.

In another embodiment, the side shields and the leading shield may be formed such that, at an intersection between the side shields and the leading shield, a throat height of the side shields substantially equals a throat height of the leading shield. In a further embodiment, the leading shield may be formed such that the throat height is greater at positions up-track from the intersection between the side shields and the leading shield than at the intersection between the side shields and the leading shield.

According to another embodiment, the leading shield may be formed such that, near the intersection of the leading gap and each of the side gaps, the throat height of the leading shield is less than the throat height of each of the side shields.

In another embodiment, the leading shield and the side shields may reduce an amount of excess fringe field emanated from a tapered leading edge of the main pole when the magnetic head is operated (e.g., current is applied to the main pole to produce a magnetic field).

Now referring to FIGS. 9A-9L, a cross-sectional view and a top view are shown during steps of a magnetic head formation process, according to one embodiment. This method of head formation may be used to produce a magnetic head having the characteristics described herein according to various embodiments.

As shown in FIG. 9A, a trench is formed in a shaping layer 904 above a leading shield layer 902, using a hard mask layer 906 formed above the shaping layer 904 which imparts a desired shape to the shaping layer 904. The trench has tapered (or beveled) edges which impart structural characteristics to layers formed thereon or therein in subsequent steps.

According to various embodiments, the shaping layer may comprise any suitable material which may be machined in subsequent steps to achieve a desired shape, such as alumina, MgO, etc. Furthermore, the hard mask may comprise any suitable material known in the art, such as Cr and alloys thereof, oxides, nitrides, etc. The trench may be formed using any technique known in the art, such as RIE, milling, etc.

In one approach, the trench may be formed in the shaping layer 904 using a POR $Al_2O_3$ trench process with a leading edge taper for a leading edge shield. In another approach, a metal trench process may be used to form the trench in the shaping layer 904, e.g., metal RIE with a milling process.

As shown in FIG. 9B, a gap layer 910 is formed on sides of the trench. The gap layer may comprise any suitable material known in the art, such as Ru typically. This gap layer 910 becomes the leading gap and side gaps for the main pole, formed subsequently.

According to one beneficial embodiment, the gap layer 910, which may subsequently form the side gaps and/or leading gap of a magnetic pole, may comprise alumina instead of Ru. The use of alumina provides for improved performance characteristics by allowing a tapered side shield to be formed from a metal trench Damascene process, which also provides for protrusion reduction from having less Ru side gap or no Ru side gap at all in the metal trench Damascene process. According to one embodiment, an alumina trench may be used in the metal trench Damascene process. In addition, a reduced bevel angle with respect to the ABS into the flare may also be achieved due to a larger mask opening in the flare region.

According to various embodiments, the gap layer 910 may be formed using a seed layer 907 and atomic layer depositing a thicker layer 908 thereon. In this process, alumina, Ru, or some other suitable material may be used for the material of the gap layer 910.

As shown in FIG. 9C, a first magnetic layer 912 is formed in the trench, possibly using a seed deposition of CoNiFe, or some other suitable magnetic material known in the art.

As shown in FIG. 9D, resist 914 is formed which imparts a shape to subsequent layers formed therein, leaving the trench exposed. The shape for this resist 914 is that of the main pole, e.g., it has a flared shape away from the ABS.

Figure 9F:
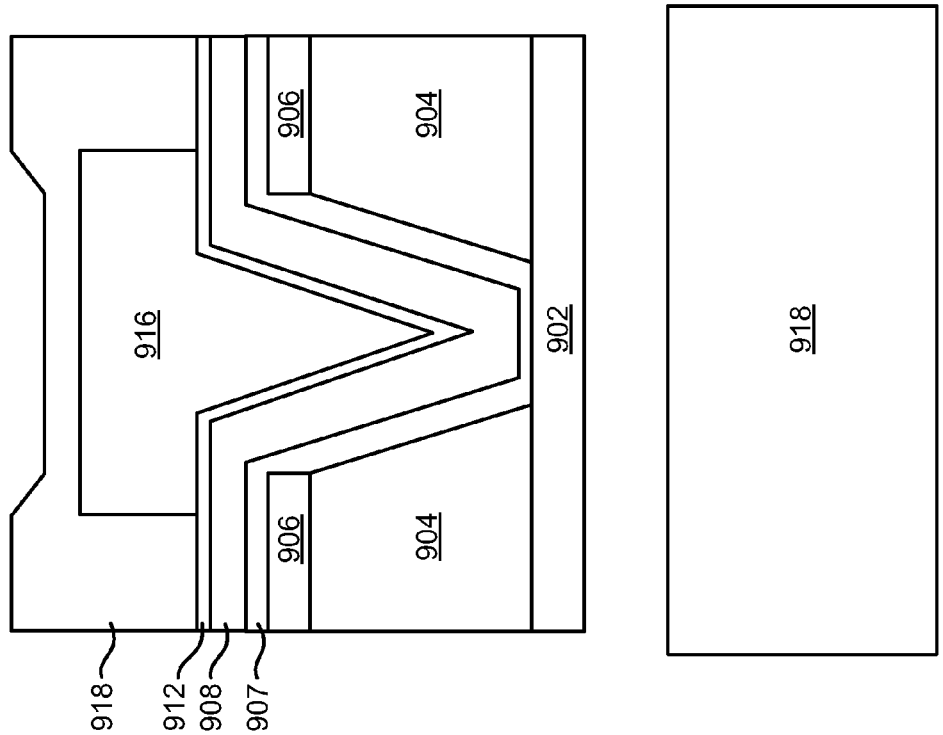
Figure 9E:
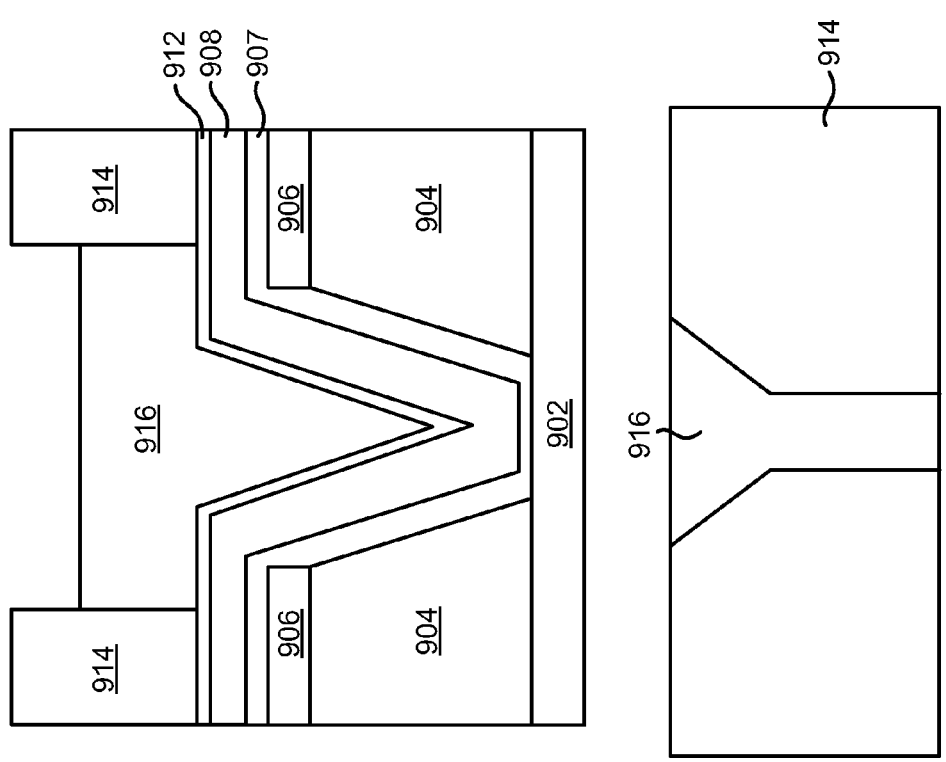

As shown in FIG. 9E, a high magnetic moment material 916 is deposited using the resist 914, the high magnetic moment material 916 comprising any suitable material known in the art, such as Co, Ni, Fe, some combination thereof, etc. This layer may be formed via plating or any other suitable technique above the exposed portions of the first magnetic layer 912.

As shown in FIG. 9F, the structure has the resist 914 stripped, and then is back-filled with alumina 918 or some other suitable material.

As shown in FIG. 9G, the structure is planarized, such as via CMP or some other suitable process, to remove the first magnetic layer 912 at portions exterior of the trench. This processing completes formation of the main pole 913.

As shown in FIG. 9H, the structure is milled or smoothed using some other technique to remove the hard mask layer 906 and any layers thereon.

Figure 9I:
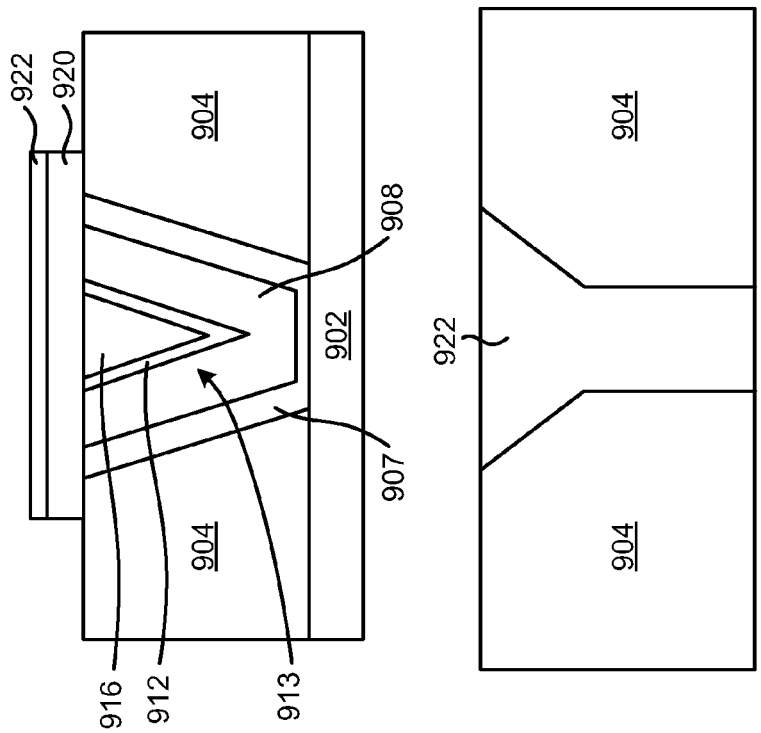

As shown in FIG. 9I, a carbon (C) layer 920 and a Cr layer 922 are deposited full film on the structure. Any other suitable trailing shield material may be used as known in the art.

Figure 9J:
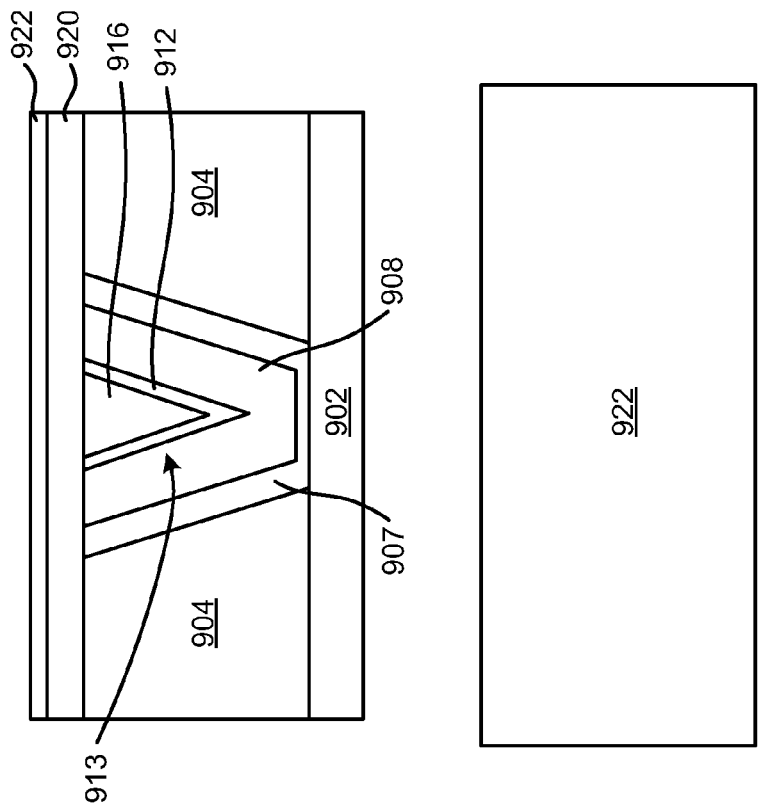

As shown in FIG. 9J, a milling, etching, or other removal process is performed to remove portions of the C layer 920 and Cr layer 922 that are positioned away from the main pole 913.

Figure 9L:
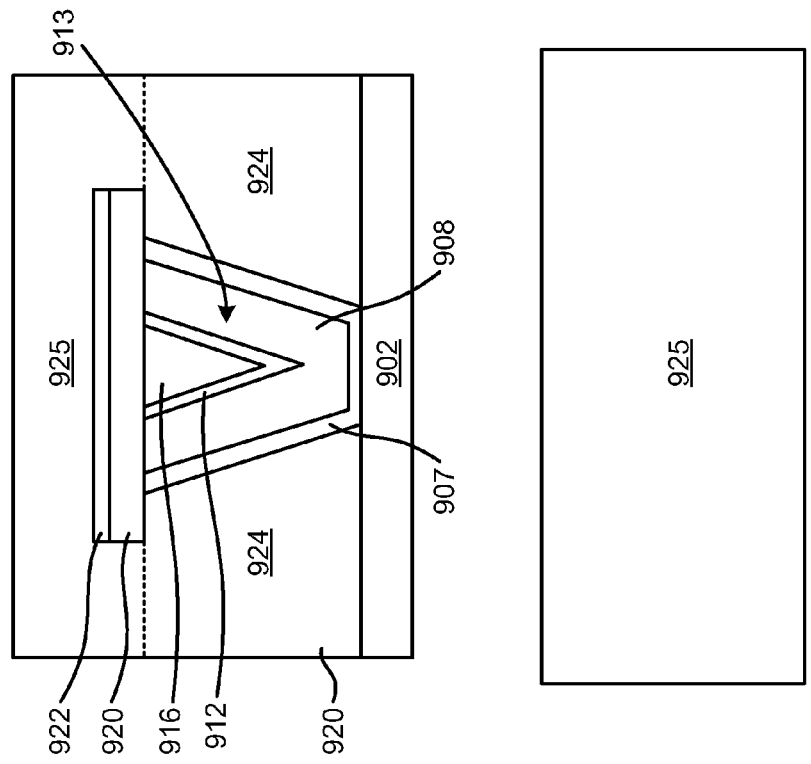
Figure 9K:
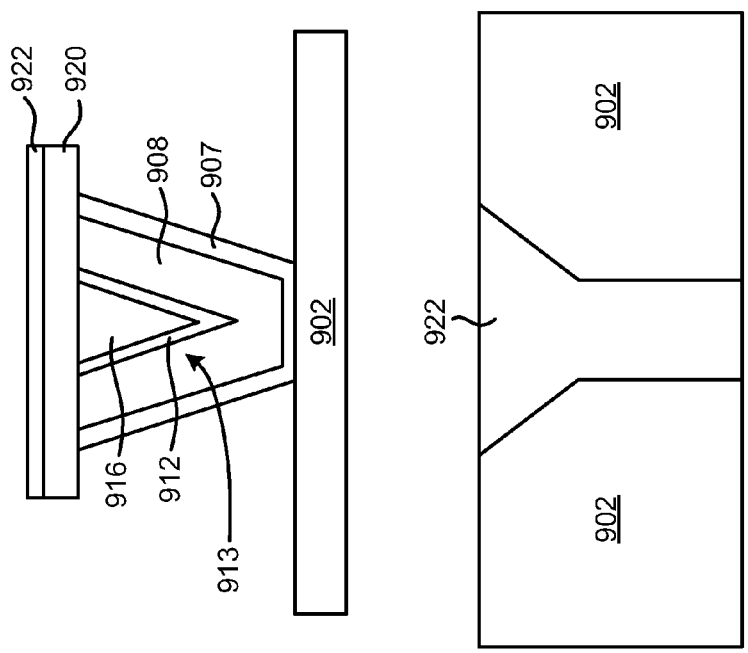

As shown in FIG. 9K, an etching process or other suitable removal process is performed to the shaping layer 904 around the main pole 913. In addition, a portion of the main pole 913 near the ABS is left exposed during a photoresist process, allowing the side shields 924 and trailing shield 925 to be deposited thereon only in the portion near the ABS.

As shown in FIG. 9L, the side shields 924 and trailing shield 925 are deposited and the structure is processed further to form other layers used in a magnetic head, as desired.

It should be noted that methodology presented herein for at least some of the various embodiments may be implemented, in whole or in part, in computer hardware, software, by hand, using specialty equipment, etc. and combinations thereof.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A magnetic head, comprising:
    a main pole having a trapezoidal cross-section at a media-facing surface thereof, wherein the main pole has a flared shape with a greater width in a cross-track direction at positions away from the media-facing surface than at the media-facing surface;
    a leading shield positioned near a leading side of the main pole, wherein a leading gap is provided between the main pole and the leading shield;
    side shields positioned on both sides of the main pole in the cross-track direction adjacent the media-facing surface of the main pole, wherein side gaps are provided between the main pole and both of the side shields; and
    a trailing gap provided on a trailing side of the main pole at the media-facing surface thereof,
    wherein a throat height of the side shields at a position closer to the trailing gap is less than the throat height of the side shields at a position closer to the leading gap.

2. The magnetic head as recited in claim 1, wherein a throat height of the leading shield at the leading gap is less than the throat height of the leading shield at a position up-track from the leading gap.

3. The magnetic head as recited in claim 1, wherein, at an intersection between the side shields and the leading shield, the throat height of the side shields substantially equals a throat height of the leading shield.

4. The magnetic head as recited in claim 3, wherein the throat height of the leading shield, at positions up-track from the intersection between the side shields and the leading shield, is greater than the throat height of the leading shield at the intersection between the side shields and the leading shield.

5. The magnetic head as recited in claim 1, wherein, near an intersection of the leading gap and each of the side gaps, the throat height of the leading shield is less than the throat height of each of the side shields.

6. The magnetic head as recited in claim 1, wherein the leading shield and the side shields reduce an amount of excess fringe field emanated from a tapered leading edge of the main pole when the magnetic head is operated.

7. The magnetic head as recited in claim 1, wherein the side gaps comprise alumina, with a proviso that the side gaps do not comprise Ru.

8. The magnetic head as recited in claim 1, wherein the leading gap comprises alumina, with a proviso that the leading gap does not comprise Ru.

9. A magnetic data storage system, comprising:
    at least one magnetic head as recited in claim 1;
    a magnetic medium;
    a drive mechanism for passing the magnetic medium over the at least one magnetic head; and
    a controller electrically coupled to the at least one magnetic head for controlling operation of the at least one magnetic head.

10. A method for forming a magnetic head as recited in claim 1, the method comprising:
    forming a shaping layer above a leading shield;
    forming a trench in the shaping layer which has tapered side walls;
    forming a leading gap and side gaps within the trench;
    forming a main pole above the leading gap and side gaps using the trench, the main pole having a trapezoidal cross-section at a media-facing surface thereof, wherein the main pole has a flared shape with a greater width in a cross-track direction at positions away from the media-facing surface than at the media-facing surface;
    forming a trailing gap above the main pole;
    forming side shields disposed adjacent the side gaps on both sides of the main pole in a cross-track direction; and
    forming a trailing shield disposed above the trailing gap,
    wherein the side shields are formed such that a throat height at a position closer to the trailing gap is less than a throat height at a position closer to the leading gap.

11. The method as recited in claim 10, wherein the leading shield is formed such that a throat height at the leading gap is less than a throat height at a position of the leading shield up-track from the leading gap.

12. The method as recited in claim 10, wherein the side shields and the leading shield are formed such that, at an intersection between the side shields and the leading shield, a throat height of the side shields substantially equals a throat height of the leading shield.

13. The method as recited in claim 12, wherein the leading shield is formed such that the throat height is greater at positions up-track from the intersection between the side shields and the leading shield than at the intersection between the side shields and the leading shield.

14. The method as recited in claim 10, wherein the leading shield is formed such that, near an intersection of the leading gap and each of the side gaps, the throat height of the leading shield is less than the throat height of each of the side shields.

15. The method as recited in claim 10, wherein the leading shield and the side shields reduce an amount of excess fringe field emanated from a tapered leading edge of the main pole when the magnetic head is operated.

16. The method as recited in claim 10, wherein the side shields and the trailing shield are formed in a single formation process.

17. The method as recited in claim 16, wherein the single formation process comprises:
   forming a resist layer in a negative pattern to the trailing shield and the side shields;
   removing the shaping layer from surfaces of the side gaps which are not in contact with the main pole at a position near the media-facing surface thereof; and
   depositing a magnetic material adjacent the side gaps and the trailing gap using the pattern of the resist layer to form the trailing shield and the side shields.

18. The method as recited in claim 10, wherein the side gaps are formed via a Damascene process and comprise alumina, with a proviso that the side gaps do not comprise Ru.

19. The method as recited in claim 10, wherein the leading gap is formed via a Damascene process and comprises alumina, with a proviso that the leading gap does not comprise Ru.

* * * * *